United States Patent [19]

Richards et al.

[11] Patent Number: 4,928,735
[45] Date of Patent: May 29, 1990

[54] REINFORCED STRIP AND FLEXIBLE HOSES PRODUCED THEREWITH

[75] Inventors: Toby D. Richards, Morris Plains; Anthony I. Antonio, Jr., Bridgewater, both of N.J.

[73] Assignee: Fabricated Plastics, Inc., Morristown, N.J.

[21] Appl. No.: 343,044

[22] Filed: Apr. 25, 1989

Related U.S. Application Data

[60] Division of Ser. No. 298,839, Jan. 18, 1989, Pat. No. 4,860,796, which is a continuation of Ser. No. 52,553, May 21, 1987, abandoned.

[51] Int. Cl.⁵ ............................................. F16L 11/08
[52] U.S. Cl. ................................. 138/154; 138/129; 138/122; 138/172; 138/173
[58] Field of Search ............... 138/129, 121, 122, 154, 138/173, 178, 172

[56] References Cited

U.S. PATENT DOCUMENTS 4,383,555  5/1983  Finley ................................. 138/154
4,420,019 12/1983  Dillon ................................. 138/154
4,589,448  5/1986  de Valle .............................. 138/154

Primary Examiner—James E. Bryant, III
Attorney, Agent, or Firm—Lerner, David, Littenberg, Krumholz & Mentlik

[57] ABSTRACT

Strips for use in forming flexible hoses from helically wound convolutions of the strip are disclosed, in which the strip has a substantially U-shaped body including a pair of radially projecting, spaced-apart walls connected by a transverse wall, and in which the body is produced from a polymeric material having a predetermined Young's modulus, and substantially the entire surface of the body is composed of that polymeric material, so that adjacent portions of the body can be directly bonded together to form a flexible hose upon the helical winding of the strip. Furthermore, supports are embedded in the pair of walls in order to reinforce the walls and permit the body to substantially retain its shape upon the application of external forces thereto. Methods for making flexible hoses from these strips are also disclosed.

6 Claims, 3 Drawing Sheets

REINFORCED STRIP AND FLEXIBLE HOSES PRODUCED THEREWITH

This is a division, of application Ser. No. 07/298,839, filed 1/18/89, now U.S. Pat. No. 4,860,796 which is a continuation of application Ser. No. 07/052,553 filed May 21, 1987, now abandoned.

FIELD OF THE INVENTION

The present invention is directed to strips for use in forming flexible hoses. Still more particularly, the present invention relates to flexible hoses themselves produced from such strips. Still more particularly, the present invention relates to methods for producing flexible hoses from helically wound strips.

BACKGROUND OF THE INVENTION

It has been known for many years that flexible plastic hoses can be produced by winding one or more strips or elongated members formed from polymeric materials into a helical structure. Upon winding displaced portions of these strips on adjacent turns of the helix, these adjacent turns, which have been referred to as connecting portions, can then be secured together, such as by the use of polymeric bonding material or hot melt compositions. These molten bonding materials are ordinarily applied to a connecting portion of such a member as it is wound into the helical structure.

Such helically wound flexible hoses, as disclosed for example in Richitelli, U.S. Pat. No. 3,199,541, have included both the use of a single strip-like member with a U-shaped channel on one edge and a projection on the opposite edge, and a two-strip hose produced from a U-shaped channel member and a cap member wound in alternating turns. The Richitelli patent also includes the use of a reinforcing material 38, such as that shown in FIGS. 6–11 thereof, which is said to be substantially stiffer than the other hose materials, and which is arranged on the radially extending walls of the hose. This patent contends that the purpose of same is to provide a stiff reinforcing element between the convolutions of the hose. In some embodiments thereof, the reinforcing material, comprising polyethylene or polyethylene copolymers is extruded and united with the basic strip immediately after the extrusion process, and the reinforcing material is exposed to the surface of the strip so that the bond between adjoining strips may involve bonding of the reinforcing material of one strip to the softer material of an adjoining strip.

Another such strip material is shown in Finley, U.S. Pat. No. 4,383,555, in which the strips include a thin web or membrane 21 of relatively soft material and a pair of relatively rigid rib components extending along the opposite margins of that web and co-extruded therewith.

Yet another flexible hose is shown in Eichelberger et al, U.S. Pat. No. 4,531,551, which discloses a flexible hose having smooth inner and outer wall surfaces instead of the undulatory outside contours presented by hoses including U-shaped members and the like. The hose in Eichelberger et al is thus prepared from S-shaped individual co-extrusions in the embodiment shown in FIGS. 1 and 2 thereof, and includes reinforcements disposed in the space between the double wall construction thus providing a material harder than the walls.

Additional flexible hoses are shown in Dillon, U.S. Pat. No. 4,420,019, which discloses a channel and cap construction in which the cap is formed of a relatively rigid material, and the channel is formed from a relatively soft material, with the cap being filled with bonding material.

Cothran, U.S. Pat. No. 4,291,728, shows in FIG. 3 thereof a spirally wound hose whose convolutions include U-shaped portions and are interlocked so that lips 33 on each convolution extend into the U-shaped portion of the adjoining convolution, and in which each such convolution is provided with a projecting portion 45a abutting lip 33a of the adjoining convolution to define a substantially smooth interior wall within the hose.

Carlson et al, U.S. Pat. No. 4,337,800, discloses yet another extruded flexible hose whose channel sections have flanges 14 abutting one another when the hose is in a straight condition, and strips 30 of a harder material at the outboard ends of the flanges.

U.S. Pat. No. 4,589,448 of del Valle shows yet another channel and cap construction in which the cap of the spirally wound hose has a hinge section 24 which is thinner than the remainder of the cap, and which is preferably formed from a polymer which is harder than the remainder of the cap, such as a hard polypropylene.

Finally, in co-pending application Ser. No. 938,551, applicant's assignee as discovered that such spirally wound hoses can be produced with enhanced structural strength and integrity, and still remain readily bondable by fusing a buffer material which is more readily susceptible to fusion under heat and/or pressure to a structural material which is a relatively difficult to fuse polymeric material having greater strength and rigidity. Molten polymeric bonding material can then be used to bond these buffer material together.

SUMMARY OF THE INVENTION

In accordance with an embodiment of the strip of the present invention, a generally U-shaped cap member is provided including a crown wall and a pair of lateral walls extending from the crown wall substantially parallel to each other, thus defining a slot therebetween, whereby displaced sections of each of the wall members are juxtaposed with one another upon helical winding of the strip, and may thus be contained within that slot.

BRIEF DESCRIPTION OF THE DRAWINGS

The present invention can be more fully appreciated with reference to the following detailed description, which refers to the attached drawings in which.

DETAILED DESCRIPTION

Referring next to the figures, in which like numerals refer to like portions thereof, channel member 10 employed in preparing a flexible hose in accordance with the present invention is generally U-shaped in section. Unless otherwise indicated, the descriptions in this disclosure of the shape of an elongated member or strip "section" should be understood as referring to the shape of the member viewed in a cross-section taken on a cutting plane transverse to its direction of elongation. Ordinarily, although not necessarily, the elongated members are substantially uniform in cross-sectional shape throughout their length.

Figure 2:
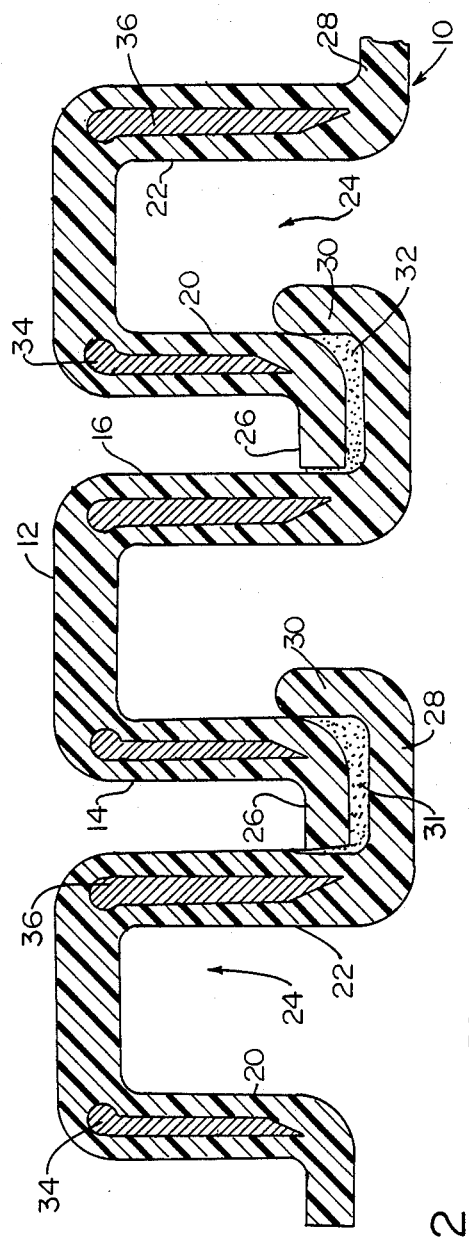
FIG. 2 is a fragmentary view taken on an enlarged scale of a portion of the hose shown in FIG. 1.

Channel member 10 includes a transverse wall portion 12 and a pair of radially projecting, substantially parallel side wall portions 14 and 16. Transverse wall portion 12 includes an inner surface 18, while radially projecting side walls 14 and 16 include inner surfaces 20 and 22, respectively, which face towards each other, thus creating inner space 24 therebetween. One side wall 14 terminates in transversely extending end portion 26, which extends only a short distance from the side wall 14. The other side wall 16 terminates in longer transversely extending side portion 28, which includes a radially extending end portion 30, thus forming a channel portion 31 (as can best be seen on the left-hand side of FIG. 2) between the radially extending side wall portion 16 and the radially extending end portion 30. As will be explained in more detail below, production of a flexible hose from this channel member or strip results from helical winding of the strip so that the transversely extending end portion 26 at the end of wall portion 14 enters into the channel portion 31 formed between radially extending wall portion 16 and radially extending end portion 30. Furthermore, production of such a flexible hose also includes the presence of bonding material 32 within channel portion 31, which assists in effecting a weld between the side walls forming the channel portion 31 and the end portion 26 of the wall portion 14. The bonding material 32 can best be seen on the righhand side of in FIG. 2 hereof. Channel or strip member 10 itself is formed substantially entirely of a readily fusible, low melting material, such as ethylene ethyl acrylate (EEA), ethylene vinyl acetate (EVA), and other such polymers having a low Young's modulus, which are thus readily fusible in accordance with the preparation of a hose in accordance herewith. These include various other ethylene copolymers, preferably with acrylic acid esters, or vinyl esters, so that these copolymers have the overall physical properties discussed above.

This material from which the channel or strip member 10 is formed thus constitutes the entire outer surface of strip 10. Thus, by merely interposing bonding material 32 therebetween, direct welding of these adjacent portions of the strip 10 can be effected, as shown in the figures, so as to produce the flexible hoses of this invention. However, because of the nature of these materials used to form the strip 10, they do not have the structural stability to resist subsequent collapse, such as upon the exertion of external forces created by vacuum and other pressures within the hose which can be anticipated during use. Therefore, within the strip itself, for example within and parallel to radially projecting side walls 14 and 16, there are included plate-like strips of reinforcing material 34 and 36, respectively. These plate-like strips of reinforcing material are formed from a relatively high melting, but difficult to fuse structural material, such as linear low density polyethylene (LLDPE), high density polyethylene (HDPE), a group of monomer resins sold under the trademark SURLYN by E.I. DuPont de Nemours & Co., and other such high Young's modulus polymeric materials.

The reinforcing plate-like strips 34 and 36 can be formed within the radially projecting side wall members 14 and 16, respectively, in a coextrusion process. As the process of coextrusion per se is conventional and well known to those skilled in the plastic arts, this process need not be described in detail herein. The coextrusion process typically brings each material to a liquid state and unites the flowing liquid streams. In coextrusion, the heat and pressure which may be applied to cause fusion of the two materials are limited only by the degradation temperature of the materials and the capacity of the equipment. Because conditions of heat and pressure far more severe than those attainable during the hose winding operation can be applied during the coextrusion operation, the two materials in question can be readily united during coextrusion.

The thickness of the material forming the strip 10, including transverse wall member 12 and radially projecting wall portions 14 and 16, is generally between about 0.020 and 0.060 inches, and more preferably between about 0.035 and 0.045 inches. The thickness of the support members 34 and 36, however, is generally between about 0.005 and 0.050 inches, and most preferably between about 0.015 and 0.030 inches.

As discussed above, and as can be shown more clearly in FIG. 1, the channel or strip member 10 thus described is wound on a generally cylindrical mandrel 50 having an axis 52 so that the strip member is formed into a plurality of turns and hence into a helix extending along axis 52. The side walls of neighboring turns of strip member 10 are juxtaposed with one another, so that the radially projecting side wall 14 of one turn of the strip member is juxtaposed with the radially projecting side wall 16 of the neighboring turn. More particularly, these side walls are juxtaposed in a manner such that the end portion 26 of radially projecting side wall member 14 enters into the channel 31 created between the radially projecting wall member 16 and radially extending end portion 30 of the adjacent turn. Prior to winding of each such turn, however, molten bonding material 32 is deposited in channel 31. Thus, when molten bonding material 32 is applied concomitantly with this winding process, and is introduced into channel 31 shortly before the next adjacent portion of the radially projecting side wall member 14 enters the channel 31 in the helical winding process, the bonding material 32 substantially fills channel 31, and the transversely extending end portion 26 of radially projecting side wall portion 14 enters into that channel, and hence into the bonding material 32 under the pressure exerted by the helical winding process itself. The bonding material 32 then progressively cools and solidifies, and bonds these edge regions of these wall portions to one another. The bonding material 32 itself consists primarily of materials such as ethylene vinyl acetate (EVA) or ethylene ethyl acrylate (EEA), which cannot only effect the bonding discussed herein, but which are thus also fully compatible with the outer surfaces of the strip 10, as discussed hereinbefore. The bonding material 32 is itself desirably maintained at a temperature of between about 350° and 500° F. when introduced into the channel 31. The relevant portions of the strip 10 should be at least at about room temperature when they contact the bonding material 32. Also, the bonding material should be introduced into channel 31 no more than about two seconds before that portion of the channel is engaged with the transversely extending end portion 26 of the next winding of the radially projecting side wall portion 14. Extraordinary bond strength is developed between the bonding material and the juxtaposed portions of the strip in this manner. Thus, the finished hose is rugged and permits full exploitation of the strength created by the overall structure in accordance with this invention.

Figure 3:
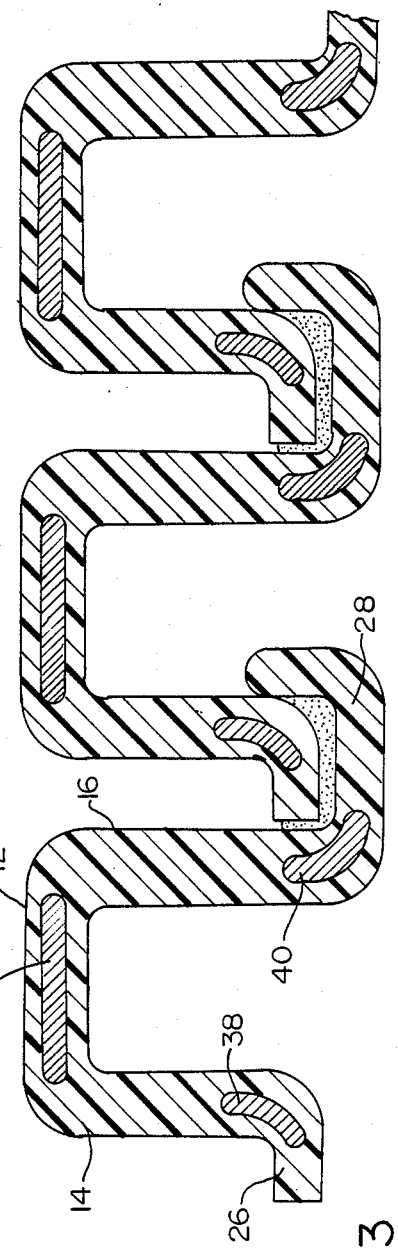
FIG. 3 is a side, sectional view of a portion of a hose produced in accordance with another embodiment of the present invention.
Figure 4:
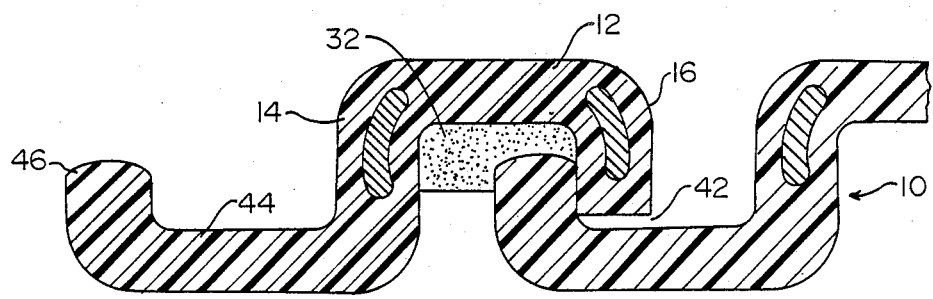
FIG. 4 is a side, sectional view of a portion of a hose produced in accordance with another embodiment of the present invention.

As will be readily appreciated, numerous variations and combinations of the features described above can be utilized Thus, the size and relative proportions of the members can be varied. Furthermore, provision of the structural support for the strip 10 can be made in other ways. For example, as shown in FIG. 3, plate-like reinforcing material can be provided in the transverse wall portion 12 by means of transversely extending plate-like portion 36, and in addition smaller plate-like portions 38 and 40 can be provided at the arcuate end portions of the radially projecting side wall portions 14 and 16, respectively, i.e., where the inner ends of these side wall portions meet and extend into transversly extending end portions 26 and 28, respectively. In yet another embodiment shown in FIG. 4 hereof, the strip 10 again includes a transverse wall portion 12, radially projecting side wall portions 14 and 16, as above, but in this case inwardly projecting side wall portion 16 terminates at 42, while radially projecting side wall portion 14 extends into transverse inner wall portion 44, which itself terminates in a short radially projecting portion 46. Thus, upon helical winding of this embodiment of strip 10, this short radially projecting portion 46 enters into the channel created within the U-shaped member created by radially projecting side wall portions 14 and 16, and transverse wall portion 12, which channel can then include the bonding material 32 therein.

Figure 5:
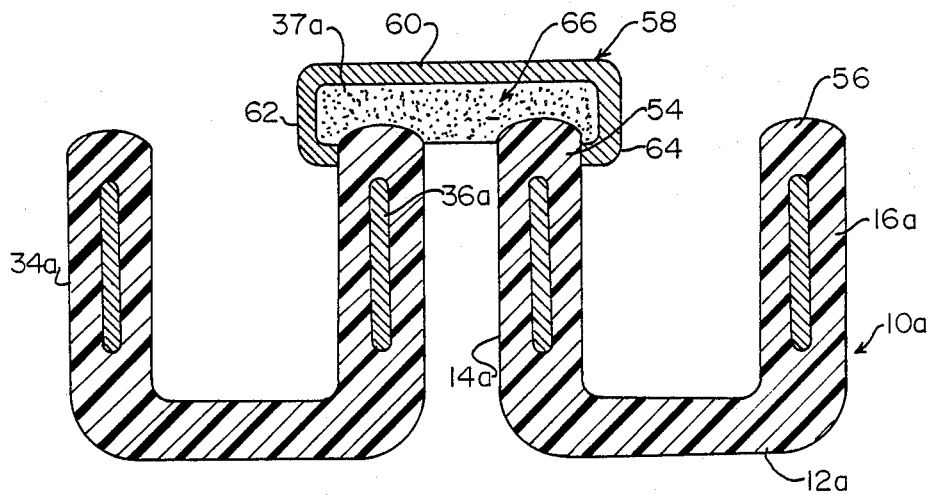
FIG. 5 is a side, sectional view of a portion of a hose produced in accordance with another embodiment of the present invention.

Referring next to FIG. 5, yet another embodiment of strip 10a used to form the flexible hose of the present invention is shown therein. In this embodiment the strip member 10a includes a transverse wall portion 12a, and radially projecting side wall portions 14a and 16a. These side wall portions 14a and 16a include edge portions 54 and 56, respectively, remote from transverse wall portion 12a. The plate-like reinforcing strips 34a and 36a in this case are embedded in side wall portions 14a and 16a, respectively.

In the embodiment of FIG. 5, a U-shaped cap member 58 is also employed, and acts as a second strip for producing the flexible hoses hereof. Cap member 58 has a crown wall 60 and lateral walls 62 and 64 projecting generally co-directionally from the crown wall 60. The interior surfaces of the cap member 58 thus form a trough 66. In this case the U-shaped cap member 58 is again formed from the same lower melting buffer materials, such as the EEA and EVA materials discussed above.

Figure 1:
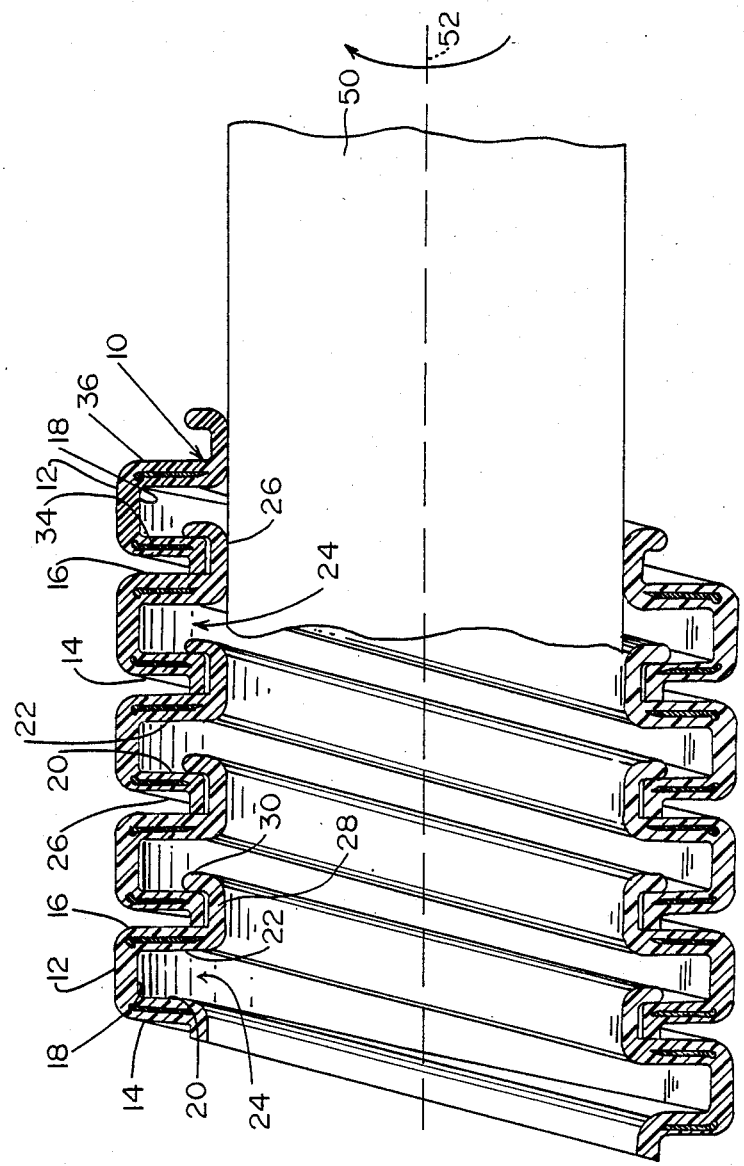
FIG. 1 is a schematic, sectional view showing portions of a hose according to one embodiment of the present invention.

After winding the strip member 10a of FIG. 5 on generally cylindrical mandrel 50 in the manner shown in FIG. 1 so that the side walls of neighboring turns of strip member 10a are juxtaposed with one another such that the first side wall 14a of one turn of this strip member is juxtaposed with the second side wall 16a of the neighboring turn, each such pair of juxtaposed strip member side walls defines a projecting ridge extending along the helix defined thereby. Cap member 58 is then wound onto the partially formed helix defined by the strip member, i.e., so that the ridge defined by neighboring turns of the strip member enter into the trough 66 of cap member 58. As in the case in the other embodiments of this invention, each portion of the cap member 58 moves downstream on the helix and passes the depositing station in which molten bonding material 37a is deposited in trough 66. In this manner, the molten bonding material 32a is applied concomitantly with the winding process, and is introduced into each portion of the cap member 58 shortly before that portion of the cap member receives the side walls of the strip member 10a in the helical winding process.

Figure 6:
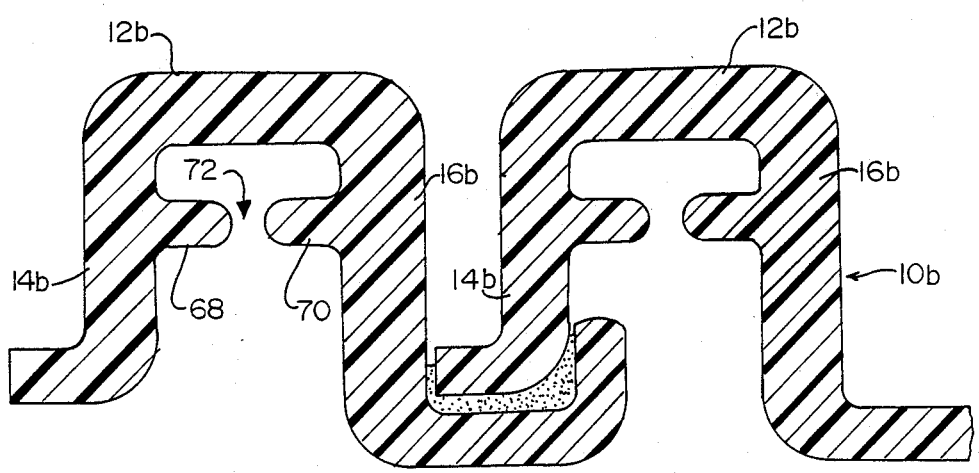
FIG. 6 is a side, sectional view of a portion of a hose produced in accordance with another embodiment of the present invention.

Referring next to FIG. 6, another embodiment of the strip member 10b of the present invention is shown therein. In this embodiment, the strip 10b has the same general configuration as the strip 10 shown in FIGS. 1 and 2 hereof. However, in this case instead of the reinforcing plate-like members 34 and 36, reinforcement is provided by inwardly projecting members 68 and 70 which extend within the inner surface of these U-shaped members from the inner surfaces of radially projecting side wall portions 14b and 16b, respectively. Therefore, upon the exertion of external force to the hose produced from this strip member 10b, the projecting members 68 and 70 will be forced together, and only a small amount of distortion is permitted, i.e., until these projecting members cross the gap 72 initially therebetween (i.e., when it is in its relaxed state). Thereafter, their contact substantially prevents further such distortion.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A hose comprising a helically wound strip defining a plurality of turns, said strip consisting essentially for a substantially U-shaped body portion including a pair of radially projecting spaced-apart wall members connected by a transverse portion, a body portion comprising a first polymeric material having a predetermined Youngs modulus, substantially the entire surface of said body portion comprising said first polymeric material, whereby displaced sections of each of said wall members are juxtaposed with one another, support means comprising plate-like support members of a second polymeric material having a predetermined Youngs modulus which is higher than said predetermined Youngs modulus of said first polymeric material, said support means being imbedded within said wall portions for reinforcing said wall member and permitting said body portion to substantially retain its shape upon the application of external force thereto, and a generally U-shaped cap member including a crown wall and a pair of lateral walls extending from said crown wall substantially parallel to each other, so as to define a slot therebetween, said juxtaposed sections of said wall members are contained within said slot and bonded to the cap member.

2. The hose of claim 1 wherein said plate-like support members are radially projecting.

3. The hose of claim 1 wherein said U-shaped cap member comprises a polymeric material having a predetermined Youngs modulus substantially corresponding to said predetermined Youngs modulus of said first polymeric material.

4. The hose of claim 1, wherein said first polymeric material comprises a polymer selected from the group consisting of ethylene, ethylacrylate, and ethylene vinyl acetate.

5. The hose of claim 1 wherein said second polymeric material comprises a polymer selected from the group consisting of linear low density polyethylene, high density polyethylene, and SURLYN.

6. The hose of claim 1 wherein said body portion and said plate-like support member comprises co-extruded portions of said strip.

* * * * *